(12) United States Patent
Georgi et al.

(10) Patent No.: US 9,527,488 B2
(45) Date of Patent: Dec. 27, 2016

(54) METHOD FOR BRAKING A VEHICLE AND A BRAKING SYSTEM USING THE METHOD

(71) Applicant: Robert Bosch GmbH, Stuttgart (DE)

(72) Inventors: Andreas Georgi, Leonberg (DE);
Armin Verhagen, Schwieberdingen (DE); Markus Henzler, Stuttgart (DE);
Remco ten Zweege, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/438,351

(22) PCT Filed: Oct. 14, 2013

(86) PCT No.: PCT/EP2013/071401
§ 371 (c)(1),
(2) Date: Apr. 24, 2015

(87) PCT Pub. No.: WO2014/063943
PCT Pub. Date: May 1, 2014

(65) Prior Publication Data
US 2015/0283983 A1   Oct. 8, 2015

(30) Foreign Application Priority Data

Oct. 25, 2012  (DE) .................. 10 2012 219 532
Nov. 27, 2012  (DE) .................. 10 2012 221 642
Feb. 1, 2013   (DE) .................. 10 2013 201 691

(51) Int. Cl.
*B60T 8/172*    (2006.01)
*B60T 8/176*    (2006.01)
(Continued)

(52) U.S. Cl.
CPC ................ *B60T 8/172* (2013.01); *B60L 7/18* (2013.01); *B60L 7/26* (2013.01); *B60T 8/176* (2013.01); *Y10S 903/947* (2013.01)

(58) Field of Classification Search
CPC ...... B60T 8/172; B60T 8/176; Y10S 903/947; B60Y 8/176
See application file for complete search history.

(56) References Cited

U.S. PATENT DOCUMENTS 5,720,533 A * 2/1998 Pastor ................. B60T 8/175
303/140
6,288,508 B1    9/2001 Taketomi et al.
(Continued)

FOREIGN PATENT DOCUMENTS

DE        44 35 953        5/1995
DE     10 2006 000145     10/2006
(Continued)

*Primary Examiner* — Fadey Jabr
*Assistant Examiner* — Martin Weeks
(74) *Attorney, Agent, or Firm* — Norton Rose Fulbright US LLP; Gerard Messina

(57) ABSTRACT

A method for braking a vehicle, a braking intervention being performed on at least one wheel of the vehicle, a total brake force for the braking intervention being generated by a hydraulic unit in the vehicle on the one hand, and, on the other hand, by at least one electric motor assigned to the one wheel, which at all times supports the brake force generated by the hydraulic unit, the total brake force being generated by modulating a brake force generated by the hydraulic unit and by modulation of the brake force generated by the electric motor on the at least one wheel, the brake force of the hydraulic unit and the brake force of the electric motor being added to yield the total brake force, and an amount of the particular brake force being controlled by a controller as a function of a driving situation of the vehicle.

7 Claims, 2 Drawing Sheets

(51) Int. Cl.
  *B60L 7/26* (2006.01)
  *B60L 7/18* (2006.01)

(56) References Cited

U.S. PATENT DOCUMENTS

| | | | |
|---|---|---|---|
| 6,312,065 B1* | 11/2001 | Freitag | B60G 17/0195 303/186 |
| 2007/0222285 A1* | 9/2007 | Ribbens | B60T 8/1703 303/139 |
| 2008/0116743 A1* | 5/2008 | Jeon | B60L 3/10 303/152 |
| 2010/0105520 A1 | 4/2010 | Ohbayashi et al. | |
| 2012/0179347 A1* | 7/2012 | Aldighieri | B60T 1/10 701/70 |
| 2012/0277966 A1* | 11/2012 | Herges | B60T 8/172 701/74 |

FOREIGN PATENT DOCUMENTS

| | | |
|---|---|---|
| DE | 10 2008 001455 | 11/2009 |
| WO | 2012/056489 | 5/2012 |

\* cited by examiner

METHOD FOR BRAKING A VEHICLE AND A BRAKING SYSTEM USING THE METHOD

FIELD OF THE INVENTION

The present invention relates to a method for braking a vehicle and a braking system using the method, in particular a method for a braking system of a vehicle including an electric drive and/or a hybrid electric drive.

BACKGROUND INFORMATION

Patent document DE 44 35 953 A1 discusses an electric vehicle including a hydraulic braking system, the electric vehicle having at least one electric motor for driving at least one wheel; however, the electric motor may also be operated during a braking operation for braking the at least one wheel, namely in addition to and in support of a hydraulic braking system, which is operated by the driver and which generates a brake force in a modulating manner in an ABS or ESP driver assistance system, for example. If no additional brake force generated by the electric motor is needed since the hydraulic braking system is sufficient in a certain driving situation, then the electric motor is deactivated as a brake force generator and is used as a motorized generator, i.e., rotatory energy of at least one wheel is stored as electrical energy in a suitable energy store via the electric motor operating as the generator. This is referred to as "regenerative or recuperative braking."

SUMMARY OF THE INVENTION

Under a first aspect, the present invention provides a method for braking a vehicle, a braking intervention being carried out on at least one wheel of the vehicle, a total brake force being generated for the braking intervention, on the one hand, by a hydraulic unit in the vehicle and, on the other hand, by at least one electric motor assigned to the one wheel, which at all times supports the brake force generated by the hydraulic unit, the total brake force being generated by modulation of a brake force generated by the hydraulic unit as well as by modulation of the brake force generated by the electric motor on the at least one wheel, the brake force of the hydraulic unit and the brake force of the electric motor being added up to yield the total brake force and an amount of the particular brake force being controlled by a controller as a function of a driving situation of the vehicle.

Under a second aspect, the present invention provides a braking system for a vehicle including an electric drive and/or a hybrid electric drive, the braking system of the vehicle operating according to the method according to the present invention.

An advantage of the provided methods is derived from the fact that, on the one hand, it is possible to generate energy by generator operation (recuperation) in all driving situations, while at the same time—regardless of the particular driving situation or braking situation—it is possible to modulate the total brake force or the wheel torque, which is obtained by adding the hydraulically generated brake force and the brake force generated by the at least one electric motor. Since the electric motor is capable of carrying out torque changes relatively rapidly, based on the hydraulic braking system, it is possible to react rapidly to requested torque changes (i.e., braking interventions). In addition, the hydraulic braking system, e.g., during an ABS braking intervention into the braking system, has a lesser effect on the "driving experience" as perceived by the driver ("stuttering brake," audible and tangible braking intervention effects) due to the supportive and also modulating (brake) effect of the electric motor.

In addition, due to the combination of hydraulic and electrical modulation, relatively more energy may be recovered in each braking situation, i.e., a greater recuperation may be achieved, not least of all since the hydraulic braking system is active during an ABS braking intervention. Thus a greater range is achievable for electric vehicles since more electrical energy is recuperable.

Since the electric motor has a relatively fast response characteristic, the result is a more dynamic driving performance during an ABS braking intervention with shorter braking distances and lower noise emission due to the supporting effect of the electric motor for the braking performance.

Due to the supporting modulating braking effect of the electric motor, the hydraulic unit may also have a simpler design and a smaller hydraulic pump may also be used.

In addition, the friction brakes situated on the wheels may have smaller dimensions and may be configured for a shorter service life.

ABS and ESP braking interventions are perceived by the driver as being more uniform and "gentler" due to the supportive modulating braking effect of the electric motor, since, as already mentioned above, the electric motor has a higher, more dynamic and more precise performance due to the relatively rapid response.

In addition, a rotatory energy of the wheel connected to the electric motor may be used for storage in an electrical energy store in the vehicle when the at least one electric motor is not in operation for generating a brake force. Therefore, as already mentioned above, rotatory energy may be recuperated (and converted) into electrical energy, which is then stored in a corresponding energy store (e.g., a battery pack) to increase the range of the electric vehicle.

A predetermined wheel torque threshold value (i.e., a requested brake force value) may be predefined by the controller; up to this threshold value, a brake force generated by the electric motor is active in a modulating manner for the case of a requested braking intervention, whereas when the electric motor providing the brake force is not active, energy, generated by the electric motor in generator mode, is stored in electrical form. In this way, for example, the hydraulic braking unit may be completely deactivated temporarily when certain conditions occur.

When the predetermined wheel torque threshold value is exceeded, a brake force, including a modulation of this brake force, is advantageously generated essentially by the hydraulic unit. In this way, a brake force (i.e., a wheel torque) is generated mainly by the more effective hydraulic braking unit.

In addition, the generated total brake force may be used in combination with a vehicle assistance system to stabilize the driving performance of the vehicle, namely in combination with ABS and/or ESP and/or ASR and/or ACC and/or SBC. It is advantageous here that the properties of an electric motor may be utilized for generating a brake force for the corresponding assistance systems, so that these assistance systems may be dimensioned to be smaller and less expensive accordingly and may be eliminated completely under some circumstances.

The controller may include a low-pass filter or an appropriately suitable filter device, whereby low-frequency changes are associated with an activation of the hydraulic braking system and high-frequency changes are associated with an activation of the electrical system. For example, a predeterminable frequency threshold value may be assigned to the hydraulic braking system, so that at a value above the low-pass threshold value, the hydraulic unit is deactivated and the at least one electric motor generates a modulated brake force, namely as a function of the particular driving situation of the vehicle. Here again, it is advantageous that the hydraulic braking system, which is rather suitable for low-frequency changes, may be deactivated, and the electric motor alone assumes the function of generating the brake force. In other words, when there are high-frequency changes, the hydraulic unit is deactivated and the electric motor takes over the modulation. The advantage of an electrical modulation is a relatively low noise emission. When there are low-frequency changes, the hydraulic unit is active, i.e., modulated, and then the electric motor may achieve maximum recuperation.

The present invention is explained in greater detail below on the basis of specific embodiments in combination with the figures.

DETAILED DESCRIPTION

Figure 1E:
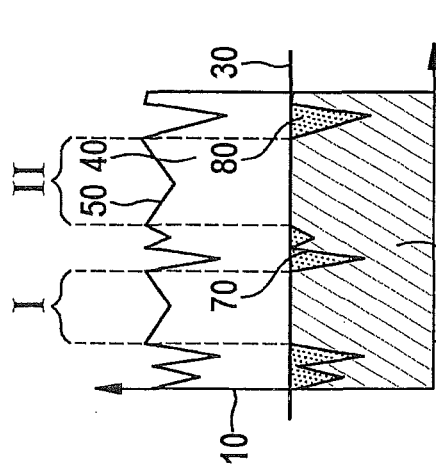
FIGS. 1e and 1f each show a chronologically dependent plot of a modulated total brake force as the addition of an electrically generated brake force and a hydraulically generated brake force according to one specific embodiment of the present invention.
Figure 1F:
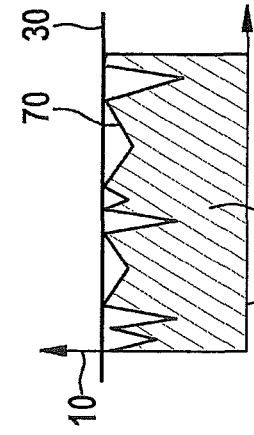
Figure 1C:
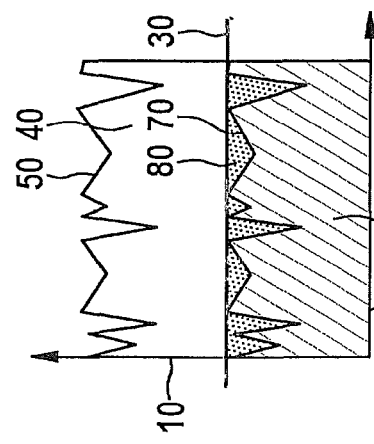
FIGS. 1c and 1d each show a chronologically dependent plot of a modulated total brake force as the addition of an electrically generated brake force and a hydraulically generated brake force according to additional related art.
Figure 1D:
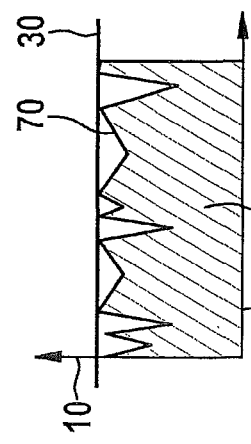
Figure 1A:
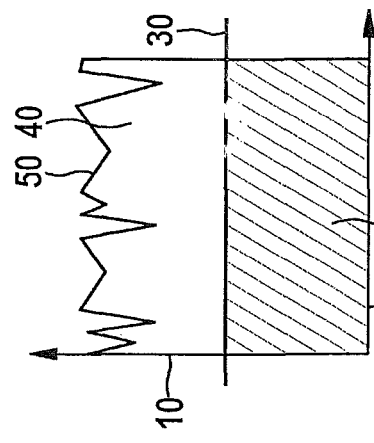
FIGS. 1a and 1b each show a chronologically dependent plot of a modulated total brake force as the addition of an electrically generated brake force and a hydraulically generated brake force according to the related art.
Figure 1B:
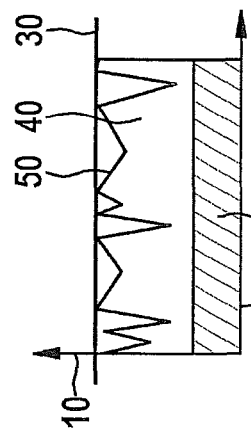

FIGS. 1a and 1b each show a diagram of a conventional method to better illustrate the method according to the present invention in comparison with the related art, a wheel torque and a brake force in each case being plotted in chronological sequence on a Y axis 10 in the diagrams, indicated in each case by an X axis 20.

In general, the diagrams in FIGS. 1b, 1d, 1f (bottom row) show driving situations having a relatively low requested wheel torque in comparison with the diagrams in FIGS. 1a, 1c, 1e (top row), in each of which a relatively higher wheel torque is requested, i.e., for example, by the driver of the vehicle by actuating the brake pedal.

In all FIGS. 1a through 1f, a threshold value 30 has been plotted, indicating the maximum brake force generated by an electric motor.

Based on the diagram shown in FIG. 1a, a "standard situation" is shown, i.e., the requested brake force is generated hydraulically, on the one hand, as indicated by area 40, and, on the other hand, by an electric motor, as indicated by hatched area 60, the brake force generated by the electric motor running continuously "at the stop," i.e., up to threshold value 30.

As is apparent in the diagram shown in FIG. 1a, the hydraulically generated brake force (area 40) is modulated, by an ABS braking intervention, for example, which is indicated by "modulated" curve 50 in FIG. 1a.

The illustrated diagram in FIG. 1b shows, as already mentioned above, a driving situation having a relatively low requested brake force (i.e., a low "µ"), the portion of the brake force being generated by the electric motor relative to the total brake force, which is derived from the addition of the hydraulically generated brake force and the electrically generated brake force (hatched area 60 in FIG. 1b) and the modulation (indicated by curve 50) of the total brake force, is generated by the hydraulically generated brake force (area 40).

It is characteristic for the customary method illustrated in the diagrams in FIGS. 1a and 1b that the electric motor does not contribute toward the modulation of the total brake force.

The diagrams illustrated in FIGS. 1c and 1d also show a method according to the related art (described in DE 44 35 953 A1), namely—for a better comparison—for the same driving situation as that described with respect to FIGS. 1a and 1b.

The difference of this customary method in comparison with the method described with respect to FIGS. 1a and 1b is that the brake force generated by the electric motor is now also "modulated," as indicated by a curve 70 in each case in FIGS. 1c and 1d, namely on the basis of the hydraulic modulation (curve 50).

It should be pointed out here that, if used, the same reference numerals used previously should denote the same components/areas/variables in the following figures or diagrams, although these will not be explained again explicitly here for the sake of simplicity.

It follows from the difference mentioned above that, with respect to the diagram shown in FIG. 1c, there is a dotted area 80 between curve 70 and threshold value 30, in which the electric motor or the generator in this case cannot recuperate any rotatory energy which thus cannot be converted into electrical energy and stored.

Another difference with regard to the diagrams shown in FIGS. 1a and 1b is apparent with respect to FIG. 1d, where braking is carried out only with the brake force generated and modulated by the electric motor (hatched area 60, curve 70) at the low requested brake force (low "µ").

The diagrams illustrated in FIGS. 1e and 1f are supposed to explain a specific embodiment of the method according to the present invention.

In contrast with the diagrams of a customary method illustrated in FIGS. 1c and 1d, the dotted area 80 in FIG. 1e is smaller than the area in the diagram shown in FIG. 1c, which means that more energy may be recuperated through the electric motor/generator since the modulation (curve 50) is "taken over" by the hydraulic braking system in some sections (sections I and II in FIG. 1e), which is controlled by a controller (not shown here).

The diagram shown in FIG. 1f is similar to the diagram shown in FIG. 1d.

Figure 2:
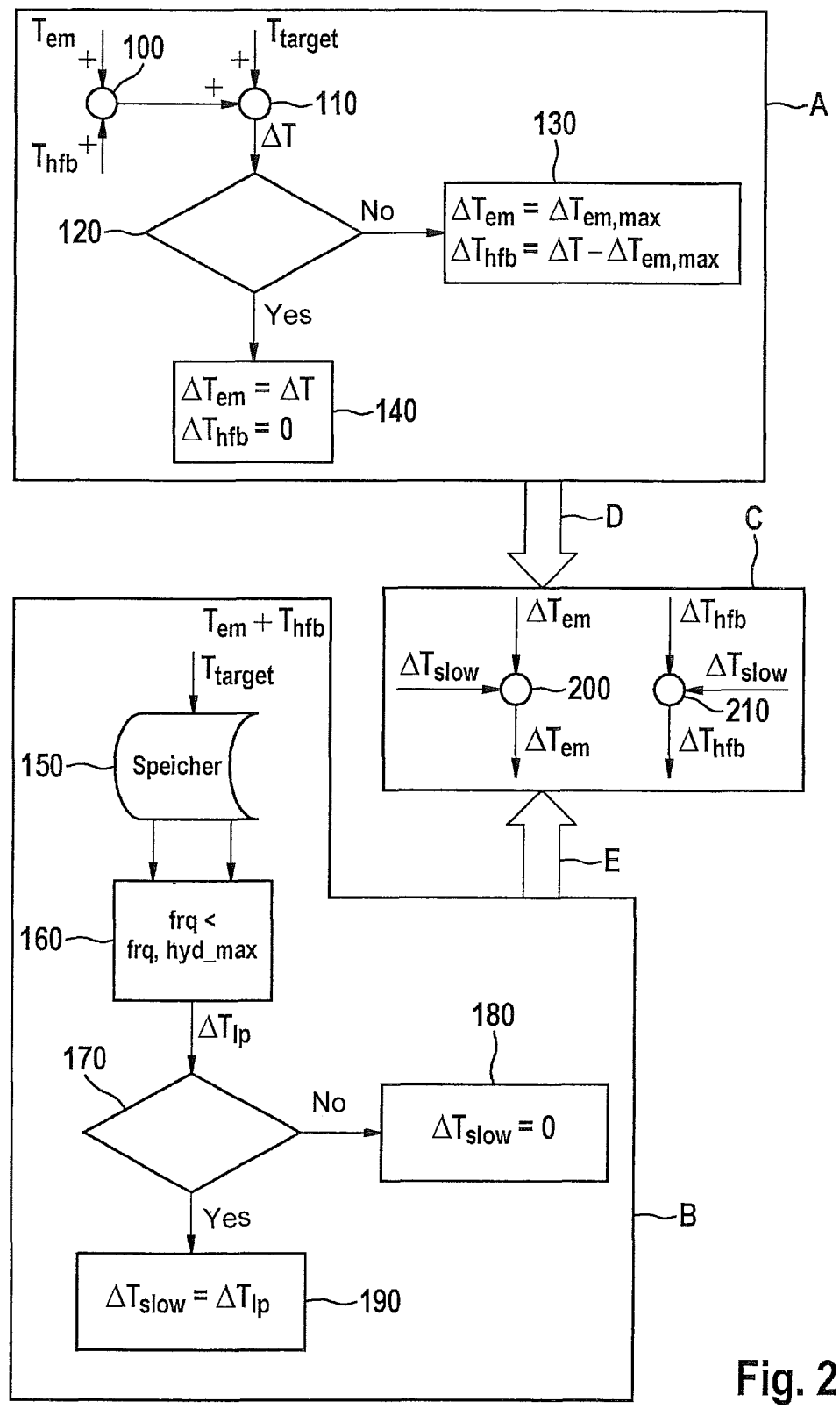
FIG. 2 shows a flow chart to illustrate one specific embodiment of the present invention.

FIG. 2 shows a flow chart of one specific embodiment of the present invention, in which the flow chart is made up of three parts A, B, C.

In part A of the flow chart in FIG. 2, the electrically and hydraulically generated brake torques $T_{em}$ and $T_{hfb}$ are added up in a step 100. The resulting sum is added to a predetermined target brake torque $T_{target}$ in a step 110, which yields $\Delta T$ as the result. In a step 120, it is queried whether the electric motor is capable of generating $\Delta T$. If the answer is "no," the method branches off to step 130, where $\Delta T_{em}$ is set to the maximum of $\Delta T_{em,max}$, and $\Delta T_{hfb}$ is set to the difference between $\Delta T$ and $\Delta T_{em,max}$, i.e., $\Delta T_{hfb} = \Delta T - \Delta T_{em,max}$. If the answer is "yes," the method branches off to step 140, i.e., $\Delta T_{em}=\Delta T$ and $\Delta T_{hfb}=0$, i.e., complete changes may be carried out by the electric motor.

In part B of the flow chart, the sum of $T_{em}$ and $T_{hfb}$ as well as target variable $T_{target}$ is stored in a memory 150 and is low-pass filtered in a step 160, i.e., only those frequency portions of the stored values are allowed to pass, which are allowed to pass by a predetermined low-pass filter: $\Delta T_{lp}$, (lp=low pass).

In a step 170, it is queried again whether the hydraulic system is capable of generating $\Delta T_{slow}$, where "slow" relates to the driving situation depicted in FIGS. 1b, 1d, 1f. This query in step 170 is carried out since the hydraulic system is active for low-frequency portions. In other words, when a frequency is low and the hydraulic system is activatable, the hydraulic system carries out the modulation and maximum recuperation is achieved via the electric motor/generator (sections I and II in FIG. 1e).

If the answer is "no," then the method branches off to step 180, i.e., $\Delta T_{slow}=0$. If the answer is yes, the method branches off to step 190, i.e., $\Delta T_{slow}=\Delta T_{lp}$.

The conditions set in parts A and B (steps 130, 140, 180, 190) are incorporated (indicated by arrows D, E) in part C of the flow chart, where $\Delta T_{em}$ and $\Delta T_{hfb}$ are obtained as results from steps 200, 210 and are conveyed by a controller (not shown) to the braking system for implementation.

It should be pointed out here that the dimensions represented in FIGS. 1 through 4 are not necessarily true to scale.

What is claimed is:

1. A method for braking a vehicle, the method comprising:
    performing, by a braking system that includes a hydraulic braking unit of the vehicle and an electric motor of the vehicle, a plurality of braking interventions on at least one wheel of the vehicle, wherein:
        for each of the plurality of braking interventions, the electric motor generates at least a portion of a total brake force of the respective braking intervention, the total brake force being modulated;
        for each of at least a subset of the plurality of braking interventions:
            the hydraulic unit generates at least a portion of the total brake force of the respective braking intervention; and
            the performing of the respective braking intervention includes determining whether the respective braking intervention includes a low frequency change or a high frequency change; and
        based on the determination:
            for those of the at least the subset of the plurality of braking interventions determined to include the low frequency change, an entirety of the modulation of the total brake force of the respective braking intervention is performed by the hydraulic braking unit; and
            for those of the at least the subset of the plurality of braking interventions determined to include the high frequency change, the electric motor contributes to the modulation of the total brake force of the respective braking intervention.

2. The method of claim 1, wherein the at least one wheel is coupled to the electric motor, and a rotatory energy of the at least one wheel coupled to the electric motor is used for storage in an electrical energy store in the vehicle when the at least one electric motor is not in operation for generating a brake force.

3. The method of claim 1, wherein a predetermined wheel torque threshold value, up to which a brake force generated by the electric motor is active in a modulating manner for the case of a requested brake intervention, is predetermined, and, when the electric motor is not active for generating brake force, energy, generated by the electric motor in generator mode, is stored in electrical form.

4. The method of claim 1, wherein the plurality of braking interventions are performed in combination with a vehicle assistance system for stabilizing the driving performance of the vehicle.

5. The method of claim 1, wherein the electric motor is capable of maximum recuperation during the braking interventions that include the low frequency change in which the entirety of the modulation of the total brake force is performed by the hydraulic braking unit.

6. The method of claim 1, wherein the plurality of braking interventions are performed in combination with at least one of an Anti-lock Braking System (ABS), an Electronic Stability Program (ESP) system, a Traction Control System (TCS), an Autonomous Cruise Control (ACC) system, and Sensotronic Brake Control (SBC) system.

7. A braking system of a vehicle, the braking system comprising:
    a controller;
    a hydraulic braking unit; and
    an electric motor;
    wherein the controller is configured to control the hydraulic braking unit and the electric motor to perform, on at least one wheel of the vehicle, a plurality of braking interventions in which:
        for each of the plurality of braking interventions, the electric motor generates at least a portion of a total brake force of the respective braking intervention, the total brake force being modulated;
        for each of at least a subset of the plurality of braking interventions:
            the hydraulic braking unit generates at least a portion of the total brake force of the respective braking intervention; and
            the performing of the respective braking intervention includes determining, by the controller, whether the respective braking intervention includes a low frequency change or a high frequency change; and
        based on the determination:
            for those of the at least the subset of the plurality of braking interventions determined to include the low frequency change, an entirety of the modulation of the total brake force of the respective braking intervention is performed by the hydraulic braking unit; and
            for those of the at least the subset of the plurality of braking interventions determined to include the high frequency change, the electric motor contributes to the modulation of the total brake force of the respective braking intervention.

* * * * *